(12) United States Patent
Fujishima et al.

(10) Patent No.: US 6,615,103 B2
(45) Date of Patent: Sep. 2, 2003

(54) MACHINE TOOL MAINTENANCE SYSTEM

(75) Inventors: Makoto Fujishima, Yamatokoriyama (JP); Yoshiaki Akamatsu, Yamatokoriyama (JP)

(73) Assignees: Moki Seiki Co., Ltd., Yamatokoriyama (JP); Intelligent Manufacturing Systems International, Sacramento, CA (US)

(*) Notice: Subject to any disclaimer, the term of this patent is extended or adjusted under 35 U.S.C. 154(b) by 145 days.

(21) Appl. No.: 09/870,468

(22) Filed: Jun. 1, 2001

(65) Prior Publication Data

US 2002/0013639 A1 Jan. 31, 2002

(30) Foreign Application Priority Data

Jun. 6, 2000 (JP) ........................................ 2000-169127

(51) Int. Cl.[7] .............................................. G05B 19/18
(52) U.S. Cl. ........................ 700/175; 700/181; 709/200; 318/566
(58) Field of Search ................................. 700/174–181; 709/200–203; 702/183–184; 408/6

(56) References Cited

U.S. PATENT DOCUMENTS

| | | | | |
|---|---|---|---|---|
| 4,497,029 A | * | 1/1985 | Kiyokawa | 700/175 |
| 5,291,416 A | * | 3/1994 | Hutchins | 700/174 |
| 5,446,672 A | * | 8/1995 | Boldys | 700/174 |
| 5,568,028 A | * | 10/1996 | Uchiyama et al. | 318/566 |
| 5,921,726 A | * | 7/1999 | Shiozaki et al. | 408/6 |
| 6,144,895 A | * | 11/2000 | Govindaraj et al. | 700/181 |
| 6,470,377 B1 | * | 10/2002 | Sevcik et al. | 709/201 |

FOREIGN PATENT DOCUMENTS

| | | |
|---|---|---|
| JP | 60-213454 | 10/1985 |
| JP | 02-065905 | 3/1990 |
| JP | 09-057581 | 3/1997 |

* cited by examiner

*Primary Examiner*—Leo Picard
*Assistant Examiner*—Douglas S. Lee
(74) *Attorney, Agent, or Firm*—Armstrong, Westerman & Hattori, LLP

(57) ABSTRACT

The present invention provides a maintenance system, which centrally performs a management operation on the life expectancies of expendable components of machine tools (21) provided in a plant for systematic maintenance of the machine tools (21). The maintenance system comprises a plurality of machine tools (21) and a management unit (20) connected to the machine tools (21). The management unit (20) comprises: a life expectancy determining section (92) for determining the degrees of wear of driver mechanisms on the basis of data indicative of the operating conditions of the driver mechanisms received from a controller (80) provided in each of the machine tools (21); a data storage section (91) for storing data indicative of the wear degrees determined by the life expectancy determining section (92), and an output section (93, 95) for outputting information on the wear degrees stored in the data storage section (91). The wear degrees of the respective driver mechanisms are centrally managed, so that a comprehensive maintenance plan can easily be formulated for the machine tools (21).

7 Claims, 11 Drawing Sheets

MACHINE TOOL MAINTENANCE SYSTEM

BACKGROUND OF THE INVENTION

1. Field of the Invention

The present invention relates to a maintenance system for a machine tool including driver mechanisms such as a spindle unit, a tool clamp unit and an automatic tool changer and a controller for controlling operations of the driver mechanisms, the maintenance system being adapted to perform a management operation on the operating life expectancies of the driver mechanisms.

2. Description of the Prior Art

One exemplary machine tool of the aforesaid type is illustrated in FIG. 10. The machine tool 21 is a so-called vertical machining center. The machine tool 21 illustrated in FIG. 10 includes: a bed 22; a column 23 provided upright on the bed 22; a spindle unit 24 rotatably supporting a spindle 25 and supported by the column 23 in a vertically movable manner; a table 26 provided below the spindle unit 24 on the bed 22; a tool magazine 40 provided on the left side of the spindle unit 24; an automatic tool changer 42 provided at a lower end of the tool magazine 40 for exchanging a tool T attached to the spindle 25 and a tool T stored in a retainer pot 41 of the tool magazine 40; a clamp unit 57 as shown in FIG. 11 for fixing the tool T to a front end (lower end) of the spindle 25; and a numerical controller 80 as shown in FIG. 13 for controlling the respective components of the machine tool 21.

As shown in FIG. 11, the spindle unit 24 includes the spindle 25, a housing 50 rotatably supporting the spindle 25 via a bearing 51, a cover 52 provided at a front end of the housing 50, and a driving motor (not shown) for rotatively driving the spindle 25. A taper hole 25a for receiving the tool T is formed in the front end of the spindle 25 (as seen in the direction of an arrow D).

As shown in FIG. 11, the clamp unit 57 includes a collet 53 provided in the spindle 25 for holding a pull stud (holder portion) Ta of the tool T fitted in the taper hole 25a of the spindle 25, a push-pull rod 54 engaged with the collet 53, a driving rod 60 coupled to the push-pull rod 54, coned disc springs 61 for biasing the driving rod 60 in the direction of an arrow E, and a hydraulic cylinder (not shown) for moving the driving rod 60 in the direction of the arrow D.

When a hydraulic pressure is supplied to the hydraulic cylinder (not shown), the clamp unit 57 moves the driving rod 60 in the direction of the arrow D against a biasing force of the coned disc springs 61, whereby the push-pull rod 54 and the collet 53 are moved in the direction of the arrow D to open a front end of the collet 53 which holds the pull stud Ta of the tool T. Thus, the tool T can be withdrawn from the taper hole 25a of the spindle 25. Where the tool T is fitted in the taper hole 25a of the spindle 25 in this state, the pull stud Ta of the tool T is inserted in the collet 53. When the supply of the hydraulic pressure to the hydraulic cylinder (not shown) is stopped in this state, the driving rod 60 is moved in the direction of the arrow E by the biasing force of the coned disc springs 61 to close the collet 53, whereby the tool T attached to the spindle 25 is held by the collet 53 with the pull stud Ta thereof inserted in the direction of the arrow E.

As shown in FIG. 12, the automatic tool changer 42 includes: a rotation shaft 43 provided parallel to the spindle 25; a changer arm 44 fixed to a lower end of the rotation shaft 43; roller-shaped cam followers 70 provided around an outer circumference of a middle portion of the rotation shaft 43 at a predetermined angular interval for rotating the rotation shaft 43 about an axis thereof; a lever-shaped cam follower 71 provided in engagement with the rotation shaft 43 below the cam followers 70 for moving the rotation shaft 43 along the axis thereof; a roller gear cam 72 having guide grooves formed in an outer circumference thereof for engagement with the cam followers 70, and a guide groove formed in a side face thereof for engagement with the cam follower 71; a gear 76 integrally fixed to the roller gear cam 72; and a motor 73 for generating a rotative driving force which is transmitted to the gear 76 via transmission gears 74, 75 and the like. The cam followers 70 each include an engagement roller rotatably supported by a bearing for engagement with the guide groove formed in the outer circumference of the roller gear cam 72. The cam follower 71 includes an engagement roller rotatably supported by a bearing for engagement with the guide groove formed in the side face of the roller gear cam 72.

In the automatic tool changer 42, the rotative driving force is transmitted from the motor 73 to the roller gear cam 72 via the gears 74, 75, 76 and the like to rotate the roller gear cam 72 about the axis thereof, whereby the rotation shaft 43 is rotated about the axis thereof by the action of the cam followers 70 engaged with the roller gear cam 72 and is axially moved by the action of the cam follower 71 engaged with the roller gear cam 72. The action of the rotation shaft 43 causes the changer arm 44 to perform a tool changing operation.

As shown in FIG. 13, the numerical controller 80 includes a CNC 81, a PLC 82, an input/output interface 83 and the like, and is connected to an external control circuit 84 via the input/output interface 83. The control circuit 84 is connected to the spindle unit 24, the automatic tool changer 42 and the clamp unit 57. The CNC 81 executes a machining program stored therein to control basic operations of the machine tool 21 such as axial movements of the spindle unit 24 and the table 26. The PLC 82 includes a spindle controlling section 82a, a clamp controlling section 82b, a changer controlling section 82c and the like, and controls auxiliary operations of the machine tool 21 such as operations of the spindle unit 24, the automatic tool changer 42 and the clamp unit 57 upon reception of commands applied from the CNC 81.

More specifically, the spindle controlling section 82a drives and controls a spindle motor (not shown) upon reception of a rotating command applied from the CNC 81 to rotate the spindle 25 shown in FIG. 11 at a commanded speed in a commanded rotation direction. The clamp controlling section 82b drives the hydraulic cylinder (not shown) of the clamp unit 57 upon reception of a tool clamp command or a tool unclamp command applied from the CNC 81 to clamp or unclamp the tool T attached to the spindle 25. The changer controlling section 82c drives the automatic tool changer 42 upon reception of a tool changing command applied from the CNC 81 to perform the tool changing operation.

As described above, the spindle 25 is rotatably supported by the bearing 51, and the cam followers 70, 71 also employ the bearings. The bearings naturally each have a limited service durability due to the wear and the like of rolling element thereof and, hence, have a finite service life. Further, the clamp unit 57 employs the coned disc springs 61, which naturally have a limited fatigue durability because the coned disc springs 61 are repeatedly subjected to a load and, hence, have a finite service life.

Where the service lives of the bearing 51, the bearings of the cam followers 70, 71 and the coned disc springs 61 end during operation to result in breakage thereof, the time required for recovery from the breakage is prolonged depending on operating conditions thereof at the breakage. Moreover, there is a danger of breakage of other components depending on the conditions of the breakage. The breakage of a greater number of components further prolongs the time required for repair of the components. This disadvantageously reduces the availability of the machine tool. If there are no spare components, the machine tool cannot be repaired until replacement components are delivered. This further reduces the availability of the machine tool. Where spare components are prepared for prevention of such an inconvenience, on the other hand, inventory may disadvantageously be increased to excess.

To cope with this problem, Japanese Unexamined Patent Publication No. 9-292311 (1997) proposes a method for estimating the life expectancy of a rolling bearing which may be employed as the bearing 51 for supporting the spindle 25. With the life expectancy estimating method, the life expectancy of the bearing 51 can be estimated, so that the bearing 51 can systematically be changed before the breakage thereof on the basis of the estimated life expectancy.

However, the life expectancy estimating method is applicable only to a case where the bearing 51 is subjected to a constant load. That is, where the load exerted on the bearing 51 varies from moment to moment as in the machine tool, it is impossible to accurately estimate the life expectancy of the bearing 51.

In most cases, a plurality of machine tools are installed in a plant and, if a life expectancy estimating unit is provided for each of the machine tools for management thereof, management efficiency may be reduced. Further, detection of the end of the service life of some component may be failed, making it impossible to perform an ideal management operation.

As described above, the machine tool generally includes various driver mechanisms which include expendable components with finite service lives, for example, the bearing 51, the bearings of the cam followers 70, 71, the coned disc springs 61 of the clamp unit 57, and a ball screw mechanism. Particularly, the ball screw mechanism requires a longer turnaround time for production thereof, so that a supplier does not always have a stock at the breakage of the ball screw mechanism.

In view of the foregoing, it is an object of the present invention to provide a machine tool maintenance system which is adapted to centrally perform a management operation on the life expectancies of expendable components of driver mechanisms in machine tools installed in a plant for systematic maintenance of the machine tools.

SUMMARY OF THE INVENTION

In accordance with a first aspect of the present invention to solve the aforesaid problems, there is provided a machine tool maintenance system, which comprises: a plurality of machine tools each including a plurality of driver mechanisms and a controller for controlling operations of the driver mechanisms; and a management unit connected to the plurality of machine tools; wherein the controller of each of the machine tools comprises a life expectancy determining section for determining the degrees of wear of the respective driver mechanisms on the basis of operating conditions of the respective driver mechanisms; wherein the management unit comprises a data storage section for receiving data indicative of the wear degrees of the respective driver mechanisms determined by the life expectancy determining sections of the respective machine tools and storing the data of the wear degrees for each of the machine tools, and an output section for outputting information on the wear degrees stored in the data storage section.

In the machine tool maintenance system according to the present invention, the wear degrees of the respective driver mechanisms such as a spindle unit and a clamp unit of the machine tool are determined on the basis of the operating conditions of the driver mechanisms by the life expectancy determining section provided in the controller of the machine tool. The data indicative of the wear degrees thus determined is transmitted to the management unit connected to the controller, and stored in the data storage section. At the same time, the information on the wear degrees is outputted by the output section.

In accordance with the invention, the data indicative of the wear degrees of the respective driver mechanisms is transmitted to the management unit, and cumulatively stored in the management unit. Even with the plurality of machine tools, the wear degrees of the driver mechanisms of the respective machine tools can centrally be managed, so that a comprehensive maintenance plan can easily be formulated for the plurality of machine tools. Thus, the availability of the machine tools can effectively be increased.

The life expectancy determining section may be adapted to estimate end-of-life times at which the service lives of the respective driver mechanisms end, on the basis of the wear degrees determined by the life expectancy determining section. The data storage section of the management unit may be adapted to receive data indicative of the wear degrees and the estimated end-of-life times from the life expectancy determining section, and store the data. Further, the output section of the management unit may be adapted to display information on the wear degrees and the estimated end-of-life times stored in the data storage section.

With this arrangement, the end-of-life times of the respective driver mechanisms are estimated by the life expectancy determining section, and the estimated end-of-life times are outputted by the output section of the management unit. Therefore, an operator can easily know the end-of-life times of the respective driver mechanisms on the basis of the output, and systematically perform a maintenance operation in the future.

In accordance with a second aspect of the present invention, there is provided a machine tool maintenance system, which comprises: a plurality of machine tools each including a plurality of driver mechanisms and a controller for controlling operations of the respective driver mechanisms; and a management unit connected to the plurality of machine tools; wherein the management unit comprises a life expectancy determining section for determining the degrees of wear of the respective driver mechanisms on the basis of data indicative of operating conditions of the respective driver mechanisms received from the controller of each of the machine tools, a data storage section for storing data indicative of the wear degrees determined by the life expectancy determining section, and an output section for outputting information on the wear degrees stored in the data storage section.

In the machine tool maintenance system, the wear degrees of the respective driver mechanisms are determined on the basis of the operating conditions of the driver mechanisms by the life expectancy determining section provided in the management unit. The data of the wear degrees thus determined is stored in the data storage section, and the information on the wear degrees is outputted by the output section. Even with the plurality of machine tools, the wear degrees of the driver mechanisms of the respective machine tools can centrally be managed as in the aforesaid case, so that a comprehensive maintenance plan can easily be formulated for the plurality of machine tools. Thus, the availability of the machine tools can effectively be increased.

The life expectancy determining section may be adapted to estimate end-of-life times at which the service lives of the respective driver mechanisms end, on the basis of the wear degrees determined by the life expectancy determining section. The data storage section may be adapted to store data indicative of the wear degrees and the estimated end-of-life times. Further, the output section may be adapted to output information on the wear degrees and the estimated end-of-life times stored in the data storage section.

With this arrangement, the end-of-life times of the respective driver mechanisms are estimated by the life expectancy determining section, and the estimated end-of-life times are outputted by the output section. Therefore, an operator can easily know the end-of-life times of the respective driver mechanisms on the basis of the output, and systematically perform a maintenance operation in the future as in the aforesaid case.

The management unit may include at least one management unit provided on the side of a user of the machine tools and connected to a management unit provided on the side of a supplier of the machine tools via a network. In this case, the supplier side management unit comprises a data storage section for storing data indicative of life expectancies of the respective driver mechanisms received from the user side management unit, and an output section for outputting information on the life expectancies stored in the data storage section.

With this arrangement, the data indicative of the life expectancies of the driver mechanisms of the respective machine tools applied from the user side management unit connected to the machine tools, i.e., the data indicative of the wear degrees where only the wear degrees of the respective driver mechanisms are determined in the user side management unit, or the data indicative of the wear degrees and the estimated end-of-life times where the end-of-life times are estimated in addition to the wear degrees, is transmitted to the supplier side management unit, then cumulatively stored in the storage section, and outputted from the output section. Thus, the machine tool supplier can know the wear degrees and the estimated end-of-life times of the driver mechanisms of the respective machine tools owned by the user, and efficiently prepare replacement components for the driver mechanisms in accordance with the wear degrees and the estimated end-of-life times.

In accordance with a third aspect of the present invention, there is provided a machine tool maintenance system, which comprises: a plurality of machine tools each including a plurality of driver mechanisms and a controller for controlling operations of the respective driver mechanisms; at least one management unit provided on the side of a user of the machine tools and connected to the plurality of machine tools; and a management unit provided on the side of a supplier of the machine tools and connected to the user side management unit; wherein the supplier side management unit comprises a life expectancy determining section for determining the degrees of wear of the respective driver mechanisms on the basis of data indicative of operating conditions of the respective driver mechanisms received from the controller via the user side management unit, a data storage section for storing data indicative of the wear degrees determined by the life expectancy determining section, and an output section for outputting information on the wear degrees stored in the data storage section. The life expectancy determining section may be adapted to determine the wear degrees of the respective driver sections and estimate end-of-life times at which the service lives of the respective driver mechanisms end, on the basis of the determined wear degrees. The data storage section may be adapted to store data indicative of the wear degrees determined by the life expectancy determining section and the estimated end-of-life times. Further, the output section may be adapted to output information on the wear degrees and the estimated end-of-life times stored in the data storage section.

With this arrangement, the machine tool supplier can know the wear degrees and the estimated end-of-life times of the driver mechanisms of the respective machine tools owned by the user, and efficiently prepare replacement components for the driver mechanisms in accordance with the wear degrees and the estimated end-of-life times.

DESCRIPTION OF THE PREFERRED EMBODIMENTS

Figure 1:
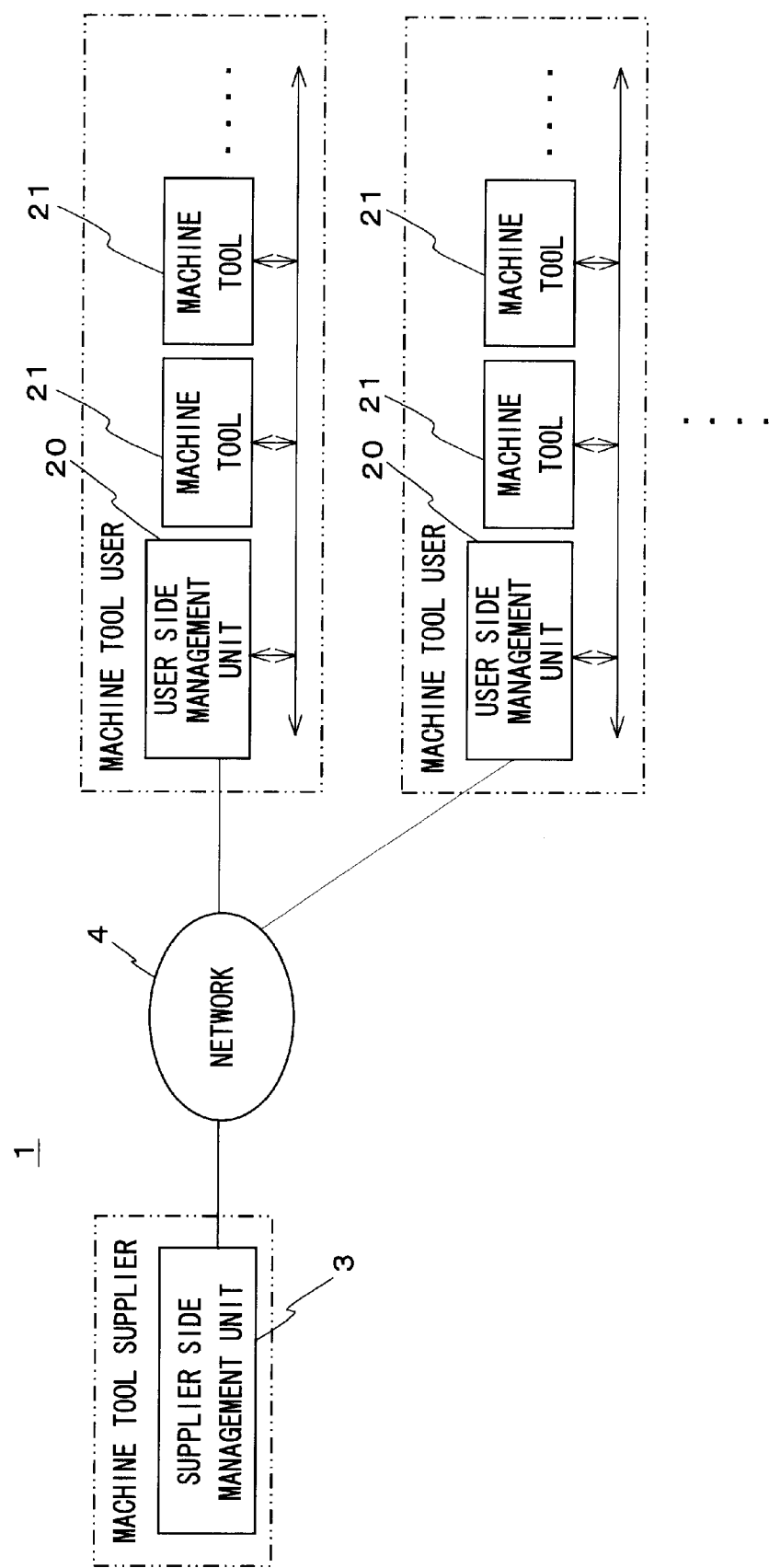
FIG. 1 is a diagram schematically illustrating the construction of a machine tool maintenance system according to one embodiment of the present invention.

With reference to the attached drawings, the present invention will hereinafter be described by way of preferred embodiments thereof. FIG. 1 is a diagram schematically illustrating the construction of a machine tool maintenance system (hereinafter referred to simply as "maintenance system") according to one embodiment of the present invention.

As shown in FIG. 1, the maintenance system of this embodiment includes: a plurality of management units 20 provided on the side of a user using machine tools 21; and a management unit 3 provided on the side of a supplier (maker) having supplied the machine tools 21, and connected to the user side management units 20 via a network 4 such as internet. For example, the user side management units 20 are each provided in a user's plant, and a plurality of machine tools 21 in the plant are connected to the user side management unit 20 via a LAN or the like. Although a machine tool shown in FIGS. 10 to 13 is employed as the machine tools 21 provided in the plants and connected to the user side management units 20 for convenience of explanation, a machine tool having any other construction may be employed.

Figure 2:
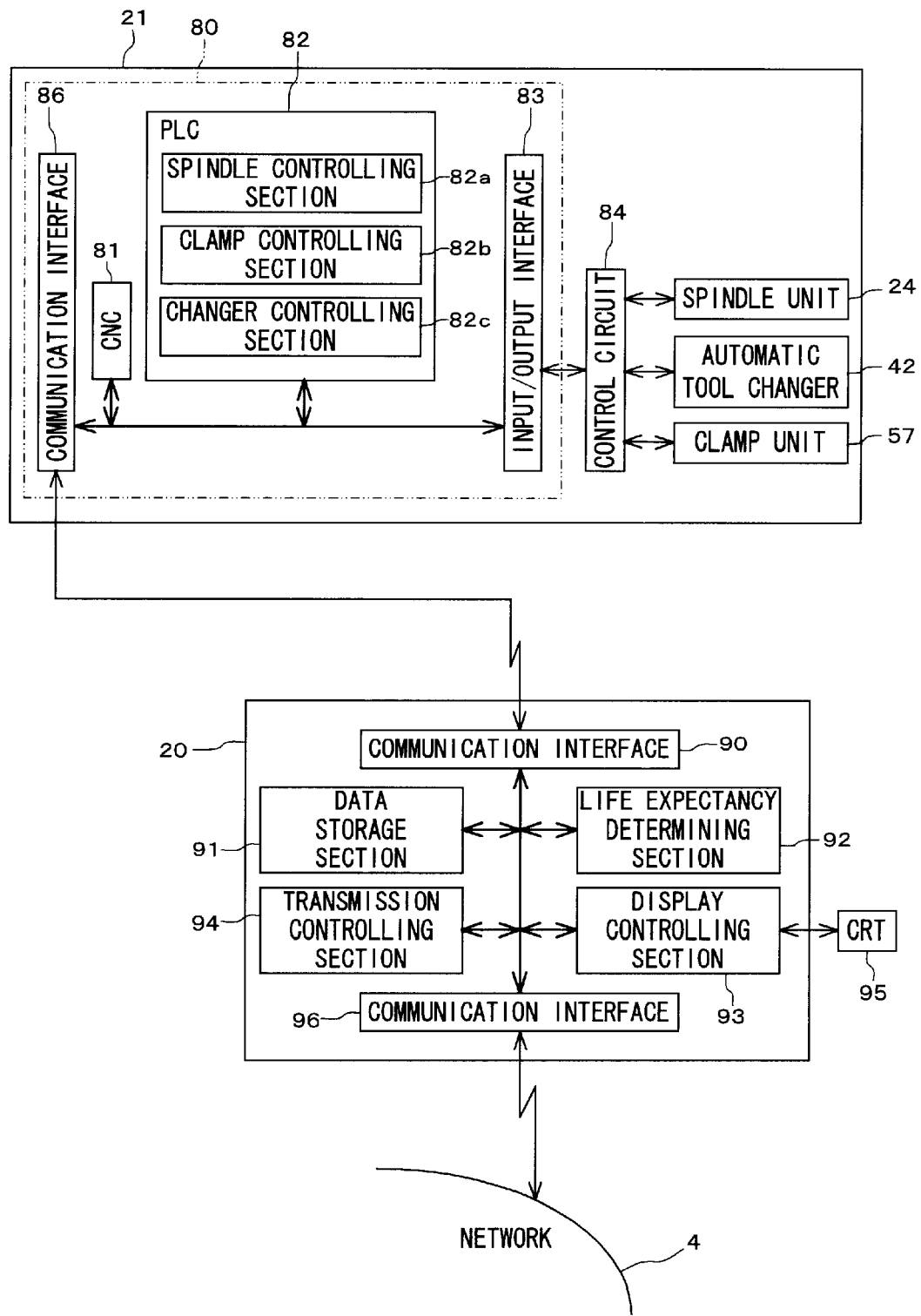
FIG. 2 is a block diagram schematically illustrating the constructions of a machine tool and a management unit provided on a user side in accordance with the embodiment.

As shown in FIG. 2, the user side management units 20 each include communication interfaces 90 and 96, a data storage section 91, a life expectancy determining section 92, a display controlling section 93, a CRT 95, a transmission controlling section 94, and the like. A communication interface 86 is provided in a numerical controller 80 in each of the machine tools 21. The machine tools 21 are each connected to the user side management unit 20 via the communication interfaces 90, 86. Thus, information on operating conditions such as a spindle load, a spindle rotation speed, a tool change command, tool clamp/unclamp commands and axial movement commands applied from a CNC 81 of the numerical controller 80 is transmitted to the user side management unit 20. The data thus transmitted is stored in the data storage section 91 for each of the machine tools 21.

The transmission of the data from the numerical controller 80 to the user side management unit 20 is effected every minute. More specifically, 2-byte data of the spindle load is produced in the CNC 81, for example, by taking a value of a load meter (%) every 10 seconds, and 12-byte data of the spindle load accumulated for one minute is transmitted to the user side management unit 20. Similarly, 2-byte data of the spindle rotation speed is produced by taking a command value of the spindle rotation speed (min$^{-1}$) every 10 seconds, and 12-byte data of the spindle rotation speed accumulated for one minute is transmitted to the user side management unit 20. Data of the tool change command and data of the tool clamp/unclamp commands are each produced by counting the number of times of command application for one minute, and 1-byte data indicative of the count of the number of the times of the command application is transmitted to the user side management unit 20.

The data thus transmitted to the user side management unit 20 and stored in the data storage section 91 is shown in Table 1. In Table 1, a code indicative of a machine type and a machine number assigned to a machine tool by the maker of the machine tool is employed as a machine ID.

TABLE 1

| n | Machine ID | Date and time | Spindle load (%) | Spindle rotation speed (min$^{-1}$) | Tool change (times) | Tool clamp/ unclamp (times) |
|---|---|---|---|---|---|---|
| 1 | SL2530102 | Feb. 21, 2000 19:01:00 | 30 | 2000 | 0 | 0 |
| 2 | SL2530102 | Feb. 21, 2000 19:01:10 | 32 | 2000 | 0 | 0 |
| 3 | SL2530102 | Feb. 21, 2000 19:01:10 | 34 | 2000 | 0 | 0 |
| 4 | SL2530102 | Feb. 21, 2000 19:01:10 | 55 | 5000 | 0 | 0 |
| : | : | : | : | : | : | : |

On the basis of the data indicative of the operating conditions stored in the data storage section 91, the life expectancy determining section 92 determines the wear degrees (current degrees of fatigue) of expendable components of respective driver mechanisms such as a bearing 51 supporting a spindle 25, coned disc springs 61 of a clamp unit 57 and bearings of cam followers 70, 71 of an automatic tool changer 42, and estimates end-of-life times of these components.

More specifically, the wear degree $L_{act}$ of the bearing 51 is calculated from the following equation (1):

$$L_{act} = \sum_{n=1}^{n} \frac{N_n}{(C/P_n)^3} \quad (1)$$

wherein $N_n$ is a cumulative number of revolutions of the spindle 25 (indicative of a sum of the numbers of revolutions of the spindle per unit time) which is calculated on the basis of the rotation speed of the spindle 25 transmitted from the numerical controller 80, C is a basic load rating which is a constant characteristic to the bearing 51, and $P_n$ is an equivalent load which is calculated on the basis of the spindle load transmitted from the numerical controller 80 from the following equation (2):

$$P_n = X \cdot F_{rn} + Y \cdot F_{an} \quad (2)$$

wherein X and Y are constants, $F_{rn}$ is a radial load, and Fan is an axial load. The radial load $F_{rn}$ is the spindle load calculated on the basis of the data obtained from the load meter, and the axial load Fan is calculated on the basis of the radial load $F_{rn}$ from the following equation (3):

$$F_{rn} = a \cdot (b \cdot F_{an})^c \quad (3)$$

wherein a, b and c are constants determined by a material of workpiece to be machined. The equation (3) is employed only for end milling. Therefore, the axial load $F_{an}$ for milling or drilling is calculated from an equation characteristic thereto.

Thus, the life expectancy determining section 92 calculates the wear degree $L_{act}$ from the equation (1) on the basis of the data of the spindle load and the spindle rotation speed transmitted from the numerical controller 80 every 10 seconds and stored in the storage section 91. It is noted that $(C/P)^3$ in the equation (1) means the cumulative number of revolutions to be reached by the spindle rotating under a constant load at the end of the service life of the bearing. As can be understood from the equation, $L_{act}$ is a sum of the wear degrees obtained every 10 seconds.

After the calculation of the wear degree $L_{act}$, the life expectancy determining section 92 calculates a life expectancy $L_{rest}$ on the basis of the service life $L_{max}$ ($L_{max}=1$ in this case) of the bearing 51 preliminarily stored in the data storage section 91 from the following equation (4):

$$L_{rest} = L_{max} - L_{act} \quad (4)$$

Then, the life expectancy determining section 92 estimates the end-of-life time of the bearing 51 on the basis of the life expectancy $L_{rest}$ and the wear degree $L_{act}$ from the following equation (5):

$$D_{rest} = D_{act} \cdot L_{rest}/L_{act} \quad (5)$$

wherein $D_{act}$ is the number of operation days of the machine tool 21, i.e., the number of days from the date of the start of the data accumulation in the data storage section 91 for the machine tool 21 to the latest data accumulation date, and $D_{rest}$ is the number of days (of life expectancy) to the end of the service life of the bearing 51, assuming that the machine tool 21 is operated under the same operating conditions. Therefore, a replacement date $D_{chg}$ can be predicted by adding the calculated $D_{rest}$ to the current date. Thus, the replacement date predicting operation is performed for the prediction of the replacement date $D_{chg}$. A statistic process may additionally be employed for the replacement date predicting operation, in which an estimation probability determined on the basis of a standard deviation in a use history, for example, is taken into consideration. If operating conditions in the future can accurately be estimated, the replacement date $D_{chg}$ can more accurately be predicted on the basis of the estimated operating conditions. That is, the accurate prediction of the life expectancy $D_{rest}$ can be achieved on the basis of simulation data obtained with the use of a machining schedule and a spindle load and a spindle rotation speed for each workpiece, and actual data.

Then, the data of $L_{act}$, $L_{rest}$, $D_{rest}$ and $D_{chg}$ calculated in the aforesaid manner is stored in the data storage section 91.

The calculation of the wear degree of the coned disc springs 61 of the clamp unit 57 and the estimation of the end-of-life time of the coned disc springs 61 are achieved in the following manner. First, the life expectancy determining section 92 sums up the numbers of times of tool clamp/unclamp operations stored in the data storage section 91, and employs the cumulative number thus calculated as the wear degree $L_{act}$.

The end of the service life of the coned disc springs 61 which repeatedly operate under a constant repetitive load is determined on the basis of the cumulative number of times of the operation of the coned disc springs 61. The cumulative number of the times of the operation is typically determined as an empirical value. Therefore, the wear degree of the coned disc springs 61 can be determined by counting the number of the times of the actuation of the clamp unit 57, more specifically, the number of the times of the operation of the coned disc springs 61. In this embodiment, the cumulative number of the times of the clamp/unclamp operations of the clamp unit 57 is employed as the wear degree $L_{act}$.

Then, the life expectancy determining section 92 calculates the life expectancy $L_{rest}$ of the coned disc springs 61 from the aforesaid equation (4) on the basis of the service life $L_{max}$ (the number of the times that the clamp unit 57 is expected to operate before the end of the service life of the coned disc springs 61) preliminarily stored in the data storage section 91. Then, $D_{rest}$ and $D_{chg}$ for the coned disc springs 61 are calculated from the aforesaid equation (5) on the basis of the life expectancy $L_{rest}$ thus calculated and the aforesaid wear degree $L_{act}$ for the estimation of the end-of-life time of the coned disc springs 61. The data of $L_{act}$, $L_{rest}$, $D_{rest}$ and $D_{chg}$ thus calculated for the coned disc springs 61 is stored in the data storage section 91.

Figure 3:
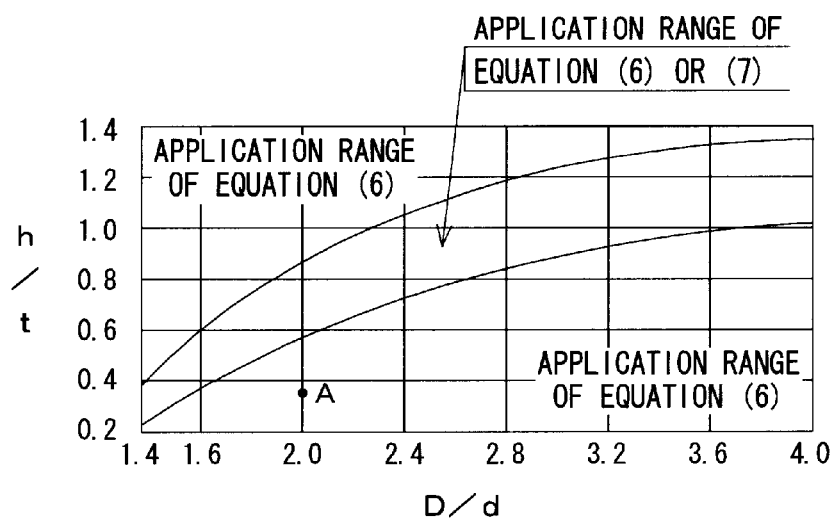
FIG. 3 is a diagram for explaining how to determine the degree of wear of a component in accordance with the embodiment.

The service life $L_{max}$ of the coned disc springs 61 is calculated, for example, in the following manner, and preliminarily stored in the data storage section 91. First, a mounting stress $\sigma_i$ exerted on the coned disc springs 61 and a maximum stress $\sigma_m$ exerted on the coned disc springs 61 under a maximum load are calculated from the following equations (6) and (7) on the basis of a graph as shown in FIG. 3. The equations (6) and (7) are Almen-Laszlo equations, and the graph of FIG. 3 defines application ranges of these equations.

$$\sigma_{t1} = \frac{4 \cdot E \cdot C}{(1-v^2) \cdot D^2} \cdot \delta \cdot \left\{ -\beta \cdot \left( h - \frac{\delta}{2} \right) + \gamma t \right\} \quad (6)$$

$$\sigma_{t2} = \frac{4 \cdot E \cdot C}{(1-v^2) \cdot D^2} \cdot \frac{\delta}{\alpha} \cdot \left\{ (2\gamma - \beta) \cdot \left( h - \frac{\delta}{2} \right) + \gamma t \right\} \quad (7)$$

wherein E is a Young's modulus, $\upsilon$ is a Poisson's ratio, $\delta$ is the flexure of each coned disc spring 61, D is the outer diameter of each coned disc spring 61, $\beta$ and $\gamma$ are stress factors, h is the height of each coned disc spring 61, t is the thickness of the coned disc springs 61, and C is a factor obtained from an initial value.

Where a mounting load $P_i$ and a maximum load $P_m$ are 610 kg and 840 kg, respectively, and the coned disc springs 61 each have an outer diameter D of 54 mm, an inner diameter d of 25.4 mm, a height of 1.1 mm with a total thickness t of 3.0 mm, for example, D/d and h/t are about 2.0 and about 0.37, respectively, which are plotted at a point A in FIG. 3. The point A belongs to the application range of the equation (6), so that the equation (6) is employed for the calculation of the mounting stress $\sigma_i$ and the maximum stress $\sigma_m$. The results of the calculation with the use of the equation (6) are shown in Table 2.

TABLE 2

|  | Load P (kg) | Flexure $\delta$ (mm) | Stress $\sigma$ (kg/mm²) |
|---|---|---|---|
| Mounting (i) | 610 | 0.39 | 63 |
| Maximum (m) | 840 | 0.55 | 92 |

Figure 4:
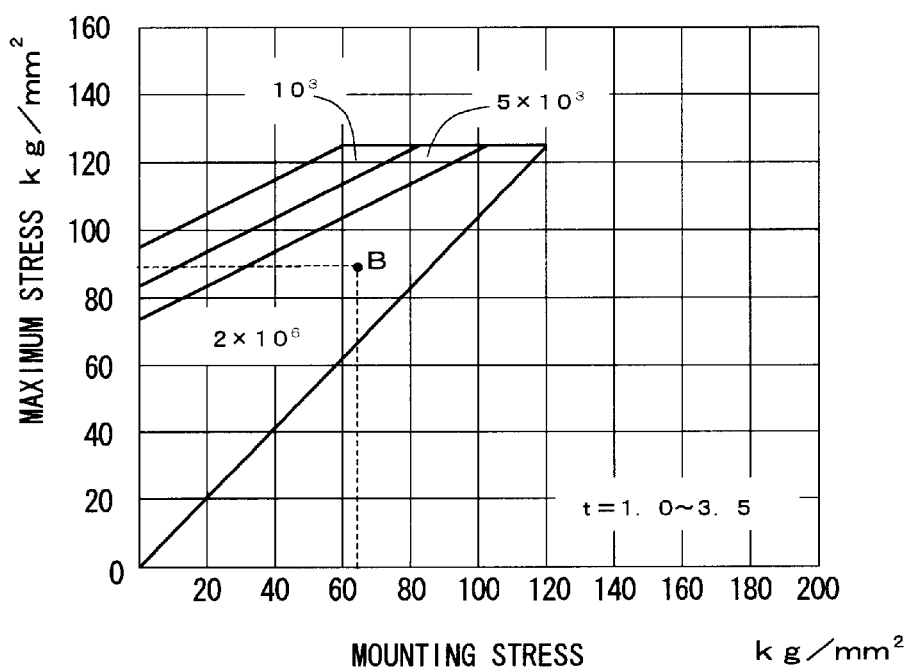
FIG. 4 is a diagram for explaining how to determine the wear degree of the component in accordance with the embodiment.

Then, the number of the times that the coned disc springs 61 are expected to operate before the end of the service life thereof is determined on the basis of the mounting stress $\sigma_i$ and the maximum stress $\sigma_m$, thus calculated and a graph as shown in FIG. 4. The graph of FIG. 4 is an empirically obtained graph which indicates a durability limit determined on the basis of the mounting stress $\sigma_1$ and the maximum stress $\sigma_m$.

Where the mounting stress $\sigma_i$ and the maximum stress $\sigma_m$ are 63 kg/mm² and 92 kg/mm² respectively, which are plotted at a point B in FIG. 4, for example, the service life $L_{max}$ is 2×10⁶. The service life $L_{max}$ thus determined is stored in the data storage section 91.

The calculation of the wear degree of the bearing of each of the cam followers 70, 71 of the automatic tool changer 42 and the estimation of the end-of-life time of the bearing are achieved in the following manner. First, the life expectancy determining section 92 sums up the numbers of times of a tool changing operation stored in the data storage section 91, and employs the cumulative number thus calculated as the wear degree $L_{act}$.

The end of the service life of the bearing which operates under a constant load is typically determined on the basis of a cumulative operation time. If the load exerted on the bearing of the cam follower 70, 71 is known (which may be determined as a design-based theoretical load), the theoretical operation time to be elapsed until the end of the service life of the bearing can be determined through calculation. The time required for each tool changing operation is constant, and can easily be measured. Further, the operation time of the bearing in the tool changing operation can experimentally or theoretically be determined.

Therefore, the cumulative operation time of the bearing can be calculated by counting the number of the times of the tool changing operation, so that the end of the service life of the bearing can be determined on the basis of the cumulative operation time thus calculated. In this embodiment, the number of times that the tool changing operation is expected to be performed before the end of the service life of the bearing is calculated as the service life $L_{max}$ of the bearing by dividing the preliminarily calculated service life period by the operation time of the bearing for each tool changing operation, and the cumulative number of the times of the tool changing operation is employed as the wear degree $L_{act}$.

More specifically, the operation time (service life period) $L_h$ to be elapsed until the end of the service life of each of the bearings of the cam followers 70, 71 is first calculated from the following equation (8)

$$L_h = (a/C_h)/(F_h N_h^{0.3}) \quad (8)$$

wherein a is a constant, $C_h$ is a load rating (constant) of the bearing, $F_h$ is a load exerted on the bearing, and $N_h$ is the number of revolutions of the bearing.

Then, the operation time of each of the bearings for each tool changing operation is experimentally or theoretically determined. The service life period $L_h$ calculated from the equation (8) is divided by the operation time of the bearing for each tool changing operation. Thus, the number of the times that the tool changing operation is expected to be performed before the end of the service life is determined for each of the bearings. The smallest one of the numbers thus determined for the respective bearings is employed as the service life $L_{max}$ of the automatic tool changer 42, and stored in the data storage section 91.

The life expectancy determining section 92 calculates the life expectancy $L_{rest}$ of the bearing from the aforesaid equation (4) on the basis of the wear degree $L_{act}$ and the service life $L_{max}$ determined in the aforesaid manner. Then, $D_{rest}$ and $D_{chg}$ are calculated from the aforesaid equation (5) on the basis of the life expectancy $L_{rest}$ thus calculated and the aforesaid wear degree $L_{act}$ for the estimation of the end-of-life time of the bearing. The data of $L_{act}$, $L_{rest}$, $D_{rest}$ and $D_{chg}$ thus calculated for the bearings of the cam followers 70, 71 is stored in the data storage section 91.

Figure 5:
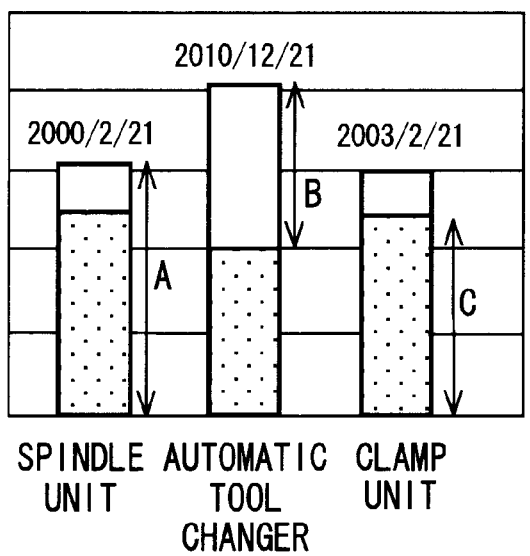
FIG. 5 is a diagram illustrating one exemplary display screen in accordance with the embodiment.
Figure 6:
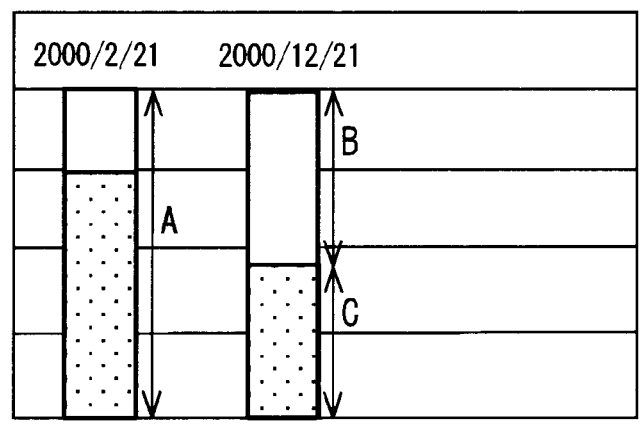
FIG. 6 is a diagram illustrating another exemplary display screen in accordance with the embodiment.

The display controlling section 93 causes the CRT 95 to display an image containing information on $L_{act}$, $L_{rest}$, $L_{max}$ and $D_{chg}$ thus determined and stored in the data storage section 91 for the bearing 51 supporting the spindle 25, the coned disc springs 61 of the clamp unit 57 and the bearings of the cam followers 70, 71 of the automatic tool changer 42. Exemplary images to be displayed are shown in FIGS. 5 and 6. FIG. 5 illustrates an image containing information on $L_{act}$, $L_{rest}$, $L_{max}$ and $D_{chg}$ for the spindle unit 24, the automatic tool changer 42 and the clamp unit 57 of a particular one of the machine tools 21. In FIG. 5, parts C, B and A indicate $L_{act}$, $L_{rest}$ and $L_{max}$, respectively, and dates indicate $D_{chg}$. FIG. 6 illustrates an image containing information on $L_{act}$, $L_{rest}$, $L_{max}$ and $D_{chg}$ for the spindle units 24 of the respective machine tools 21. In FIG. 6, parts C, B and A indicate $L_{act}$, $L_{rest}$ and $L_{max}$, respectively, and dates indicate $D_{chg}$ as in FIG. 5.

The transmission controlling section 94 transmits the data of $L_{act}$, $L_{max}$ and $D_{chg}$ for the bearing 51 supporting the spindle 25, the coned disc springs 61 of the clamp unit 57 and the bearings of the cam followers 70, 71 of the automatic tool changer 42 and the machine IDs of the respective machine tools stored in the data storage section 91 as well as user IDs preliminarily assigned to the respective user side management units 20 to the supplier side management unit 3 via the network 4.

Figure 7:
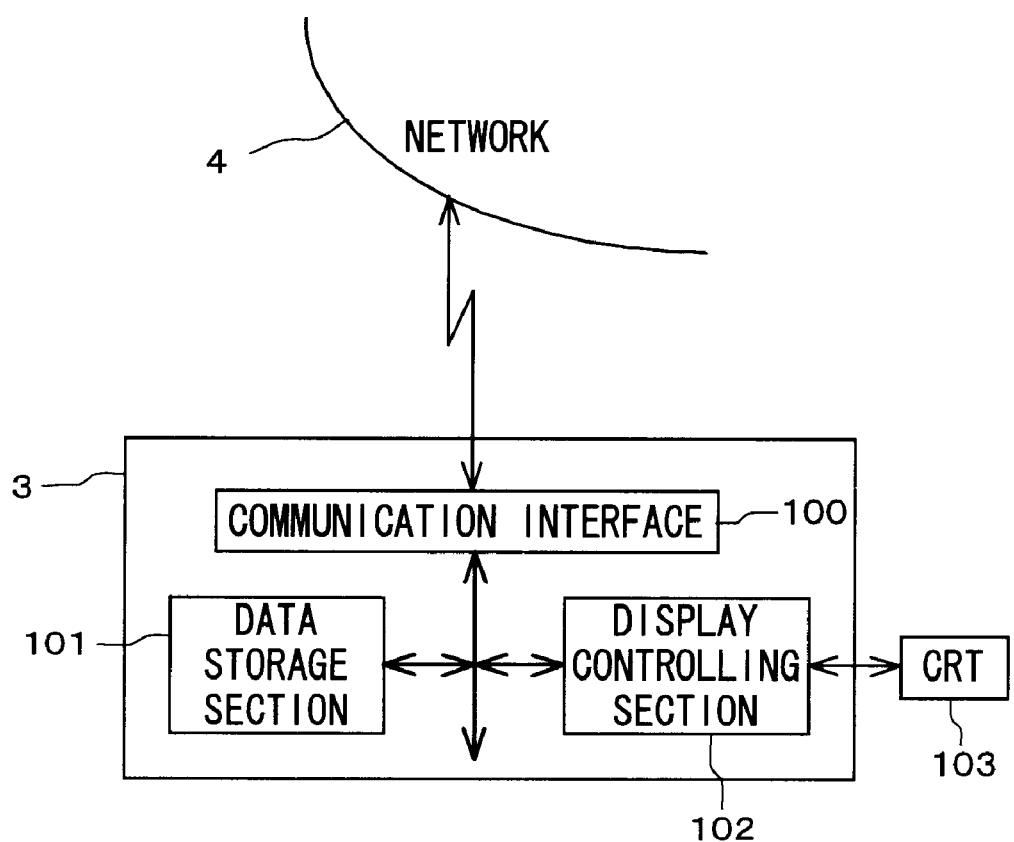
FIG. 7 is a block diagram schematically illustrating the construction of a management unit provided on a supplier side in accordance with the embodiment.

As shown in FIG. 7, the supplier side management unit 3 includes a communication interface 100, a data storage section 101, a display controlling section 102 and a CRT 103. The supplier side management unit 3 stores the data of $L_{act}$, $L_{max}$ and $D_{chg}$ and the machine IDs transmitted from the respective user side management units 20 in the data storage section 101 in connection with the user IDs of data originators. The data to be stored in the data storage section 101 has a format as shown in Table 3.

TABLE 3

| User ID | Machine ID | Component | $D_{chg}$ | $L_{max}$ | $L_{act}$ |
|---------|------------|-----------|-----------|-----------|-----------|
| JPN_0232 | SL2530102 | Spindle | Jun. 2, 2000 | 1 | 0.800 |
| JPN_0363 | SL2530103 | Spindle | Aug. 5, 2000 | 1 | 0.700 |
| : | : | : | : | : | : |
| : | : | : | : | : | : |

Then, the display controlling section 102 causes the CRT 103 to display an image containing the data of $L_{act}$, $L_{max}$ and $D_{chg}$ stored in the data storage section 101. Images to be displayed on the CRT 103 have substantially the same formats as shown in FIGS. 5 and 6.

With the maintenance system 1 of this embodiment having the aforesaid construction, the information on the operating conditions such as the spindle load, the spindle rotation speed, the tool change command, the tool clamp/unclamp commands and the axial movement commands outputted from the CNC 81 to the PLC 82 of the numerical controller 80 in each of the machine tools 21 is transmitted from the CNC 81 to the user side management unit 20 connected thereto at a predetermined time interval (every minute), and stored in the data storage section 91. Then, the wear degree $L_{act}$, the life expectancy $L_{rest}$, the number of days of the life expectancy $D_{rest}$ and the replacement date $D_{chg}$ for each of the expendable components such as the bearing 51 supporting the spindle 25, the coned disc springs 61 of the clamp unit 57 and the bearings of the cam followers 70, 71 of the automatic tool changer 42 are calculated by the life expectancy determining section 92, and stored in the data storage section 91.

The data of the wear degree $L_{act}$, the life expectancy $L_{rest}$, the number of days of the life expectancy $D_{rest}$ and the replacement date $D_{chg}$ thus calculated is displayed as a graphical image on the CRT 95, and transmitted to the supplier side management unit 3 via the network 4. In the supplier side management unit 3, the data of the wear degree $L_{act}$, the life expectancy $L_{rest}$, the number of days of the life expectancy $D_{rest}$ and the replacement date $D_{chg}$ thus transmitted from the user side management unit 20 via the network 4 is stored in the data storage section 101 for each user ID, and displayed on the CRT 103 for each user ID.

In accordance with this embodiment, the wear degree $L_{act}$, the life expectancy $L_{rest}$, the number of days of the life expectancy $D_{rest}$, the replacement date $D_{chg}$ and the like for each of the driver mechanisms such as the spindle unit 24 in the machine tools 21 are calculated by the user side management unit 20, and cumulatively stored therein. Where a plurality of machine tools 21 are installed in a single plant, for example, a user of the machine tools 21 can centrally perform a management operation on the wear degrees and the replacement dates of the components of the driver mechanisms of the respective machine tools 21. Thus, the user can easily formulate a comprehensive maintenance plan for the plurality of machine tools 21 thereby to enhance the availability of the machine tools 21.

In this embodiment, the life expectancy determining section 92 of the user side management unit 20 estimates the end-of-life times of the expendable components of the respective driver mechanisms, and the estimated end-of-life times are displayed on the CRT 95 of the user side management unit 20. Therefore, the user can easily know the end-of-life times of the expendable components by viewing the CRT and, hence, can easily implement the maintenance plan in the future.

The data of the wear degrees and the end-of-life times of the expendable components of the respective driver mechanisms is transmitted to the supplier side management unit 3 from the respective user side management units 20, and cumulatively stored in the supplier side management unit 3 and displayed on the CRT 103. Therefore, the supplier (maker) of the machine tools 21 can centrally perform the management operation on the wear degrees and the end-of-life times of the expendable components of the machine tools 21 owned by the user, and easily keep track of the operating conditions of the machine tools 21. Accordingly, the supplier can systematically and efficiently prepare replacement components in accordance with the wear degrees and the end-of-life times of the respective expendable components.

Figure 8:
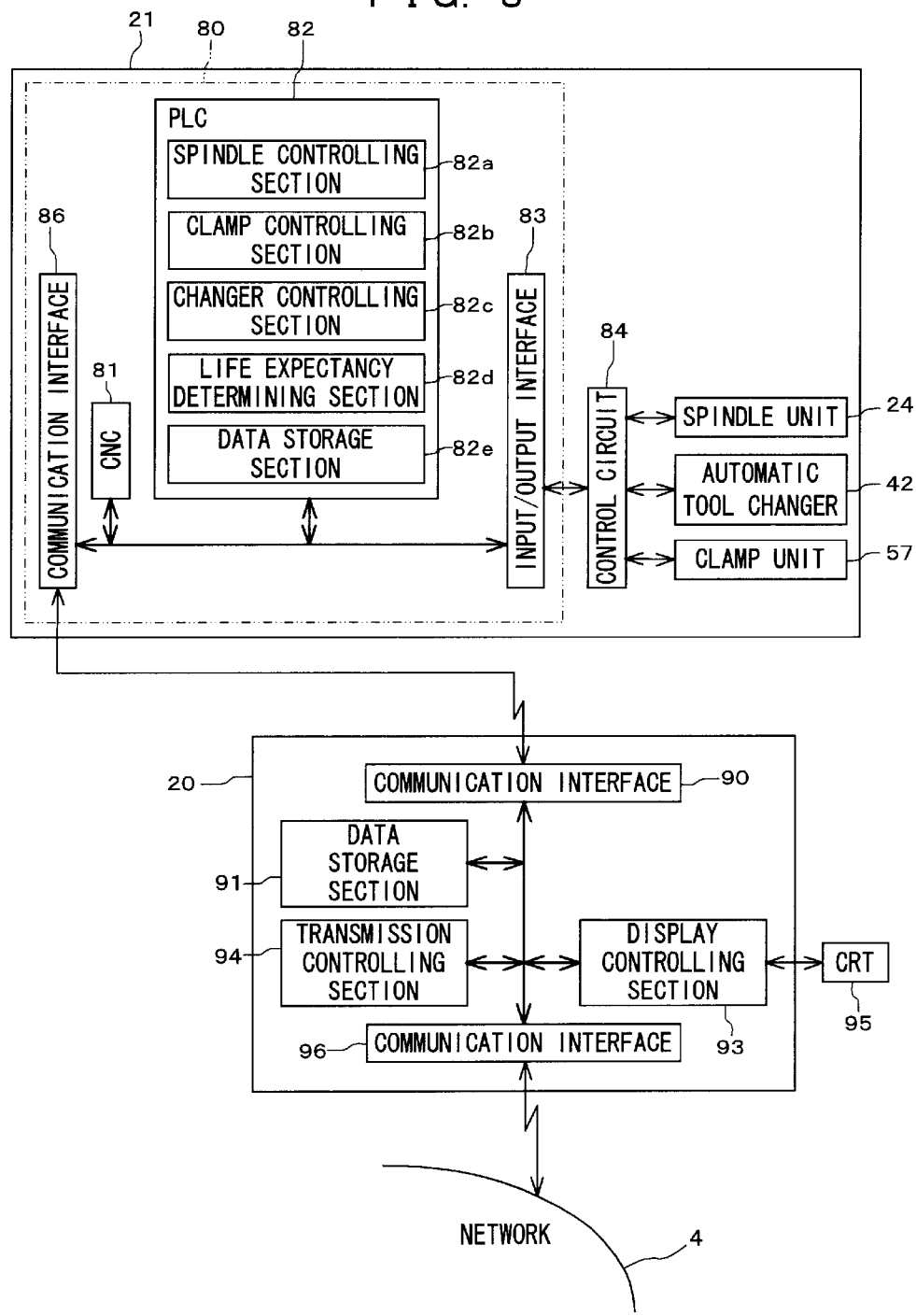
FIG. 8 is a block diagram schematically illustrating the constructions of a machine tool and a management unit provided on a user side in accordance with another embodiment of the present invention.

Although the user side management unit 20 determines the wear degrees $L_{act}$ and estimates the replacement dates $D_{chg}$ on the basis of the information on the spindle load and the like transmitted thereto from the machine tools 21 in this embodiment, a life expectancy determining section 82d may be provided in the PLC 82 of each of the machine tools 21 as shown in FIG. 8, and adapted to perform the same operations as the life expectancy determining section 92 for the determination of the wear degrees $L_{act}$ and the estimation of the replacement dates $D_{chg}$. In this case, the data of the wear degrees $L_{act}$, the replacement dates $D_{chg}$ and the like is stored in a data storage section 82e, and regularly transmitted to the user side management unit 20. In the user side management unit 20, the data of the wear degrees $L_{act}$, the replacement dates $D_{chg}$ and the like is stored in the data storage section 91 for each of the machine tools 21, and regularly transmitted to the supplier side management unit 3 under the control of the transmission controlling section 94. This arrangement provides the same effects as the maintenance system 1 described above.

Figure 9:
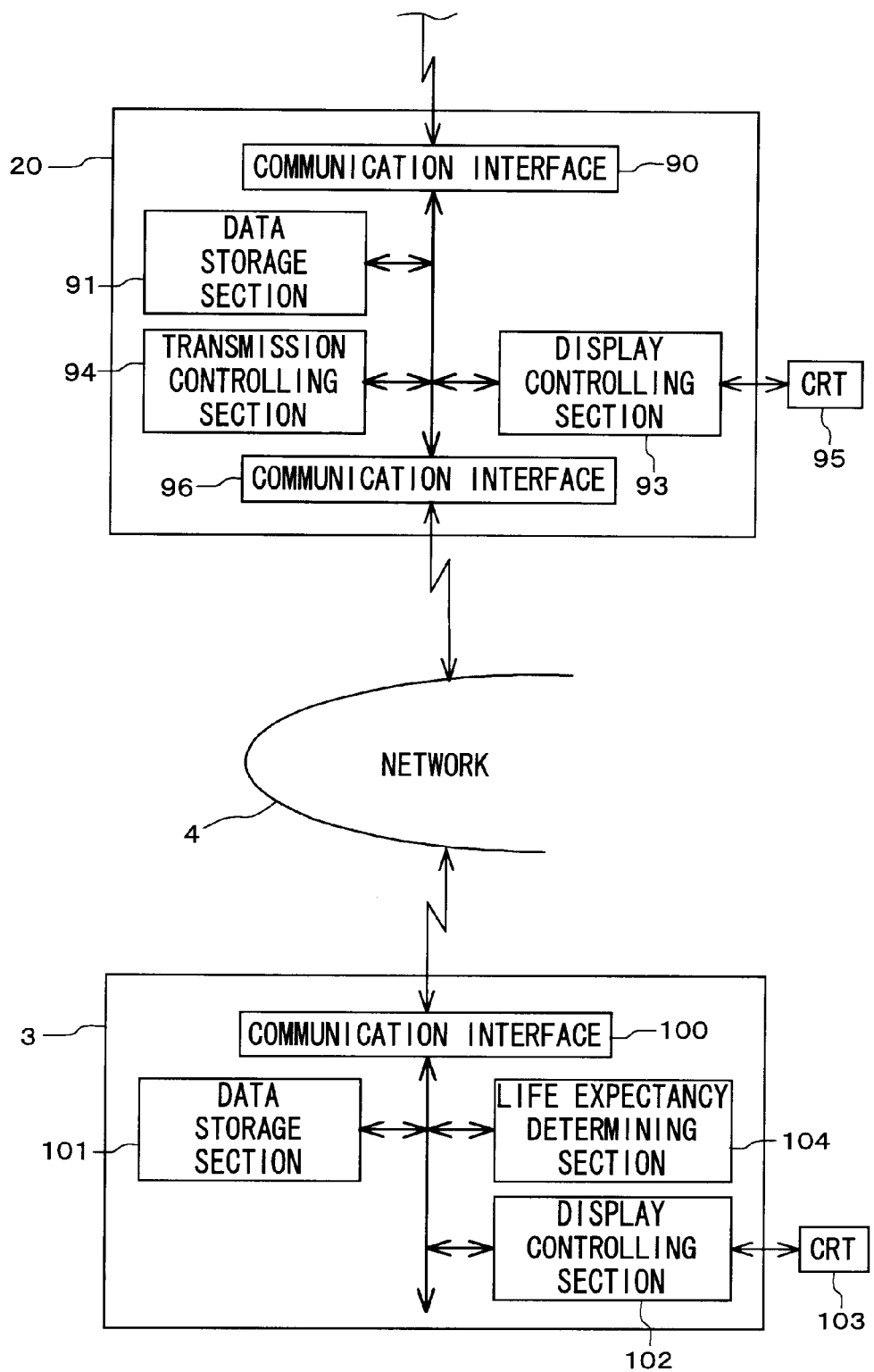
FIG. 9 is a block diagram schematically illustrating the constructions of a management unit provided on a user side and a management unit provided on a supplier side in accordance with further another embodiment.
Figure 10:
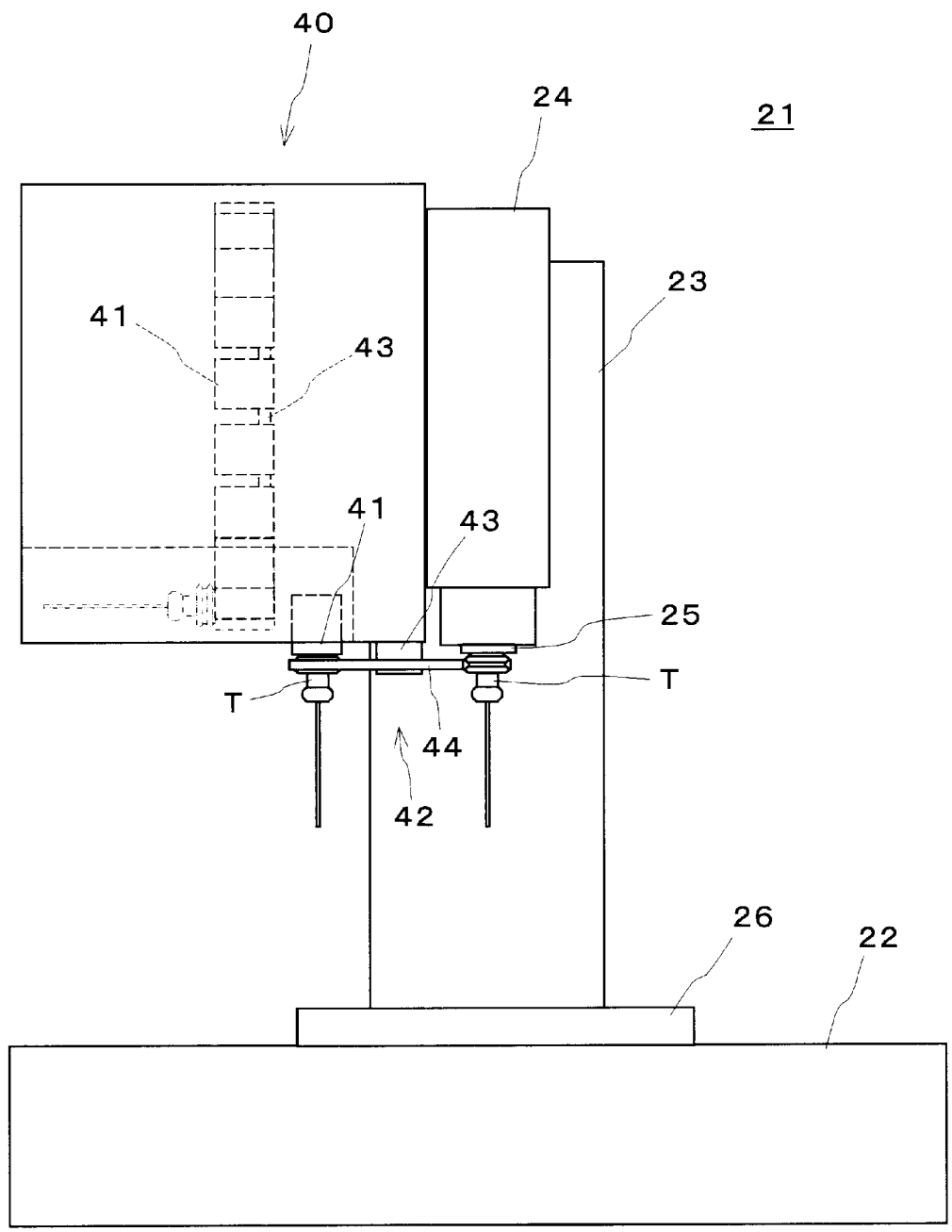
FIG. 10 is a front view illustrating one exemplary machine tool to be employed in the embodiment.
Figure 11:
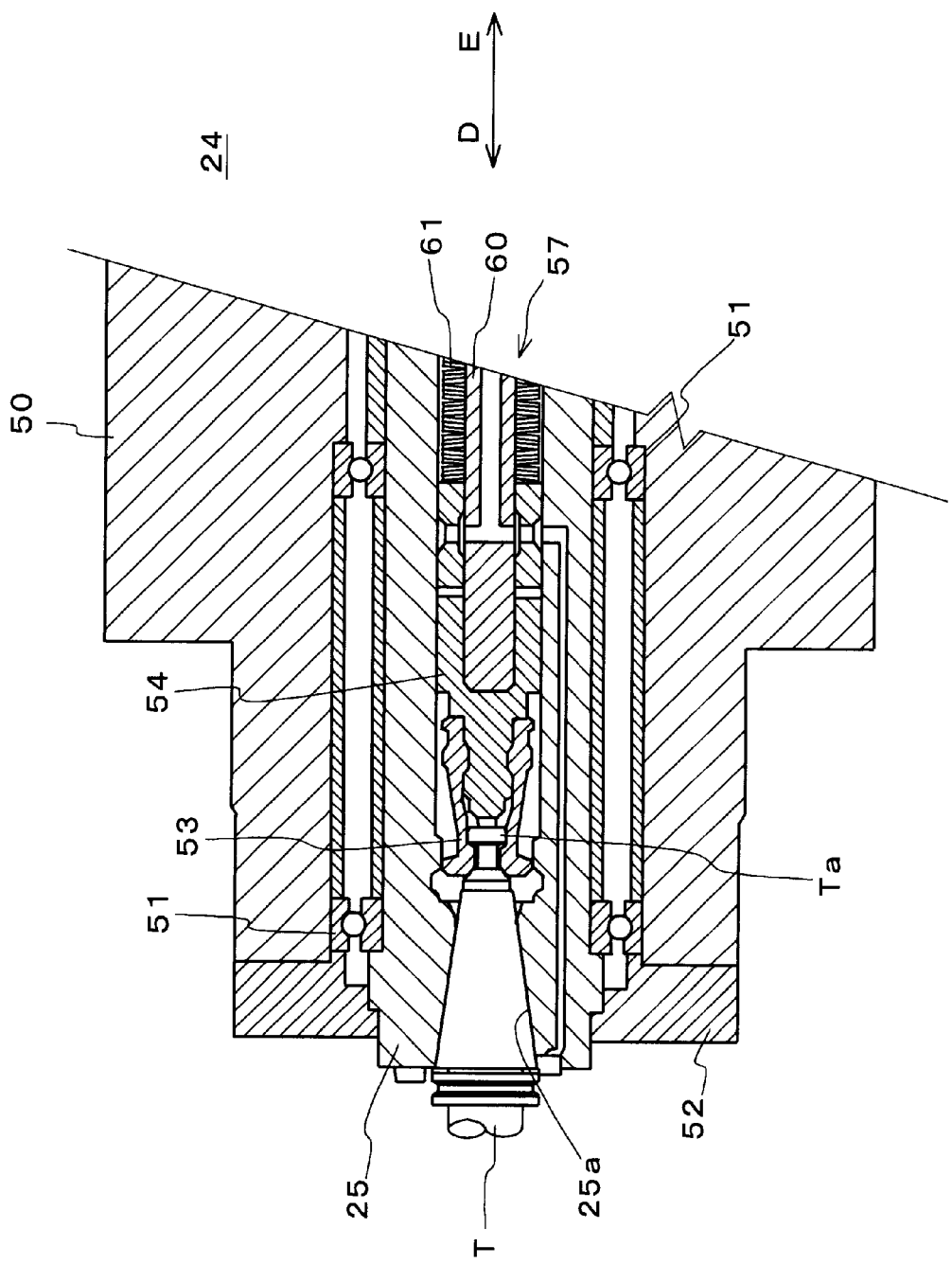
FIG. 11 is a sectional view illustrating a spindle unit of the machine tool shown in FIG. 10.
Figure 12:
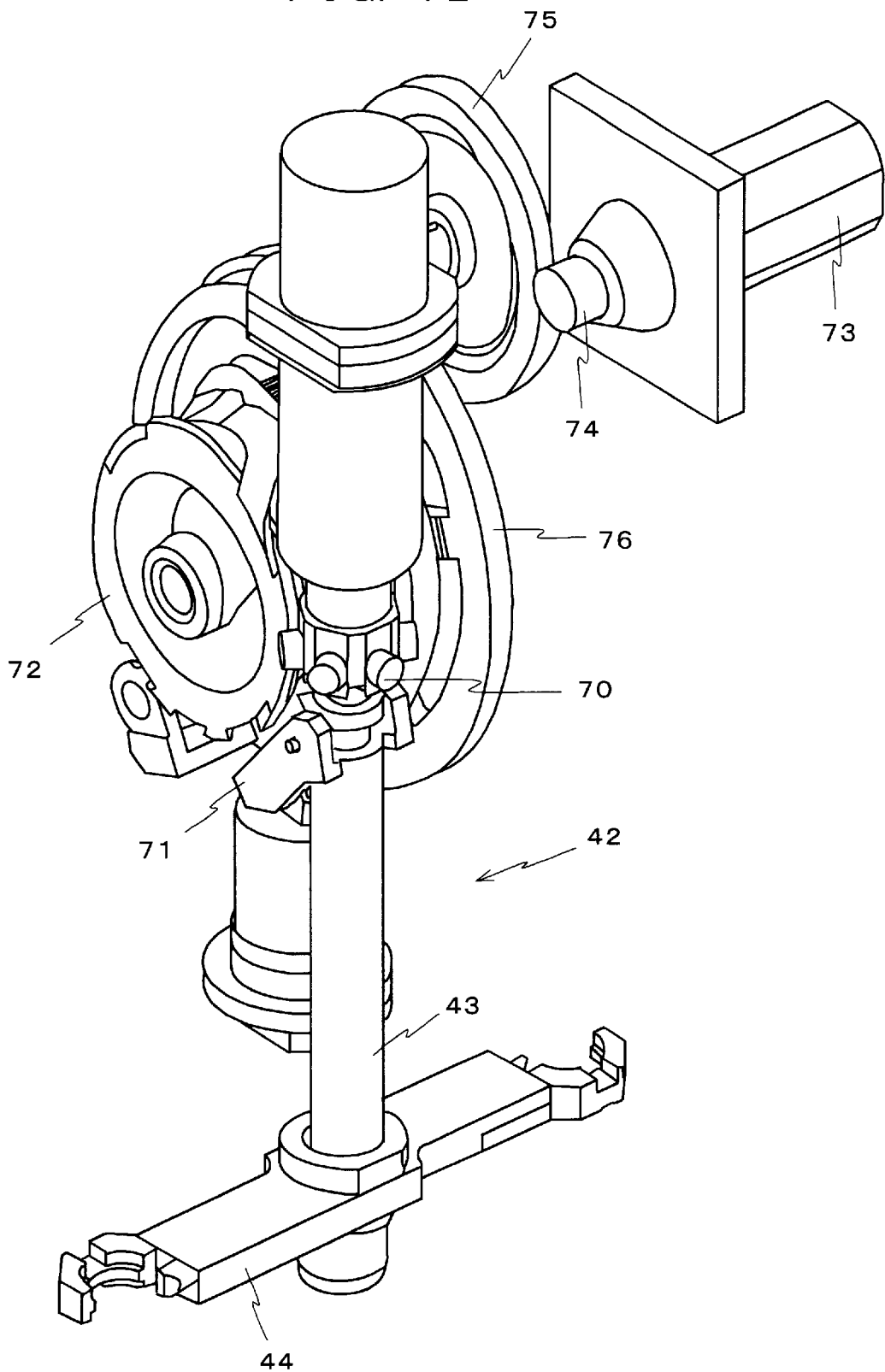
FIG. 12 is a perspective view illustrating an automatic tool changer of the machine tool shown in FIG. 10.
Figure 13:
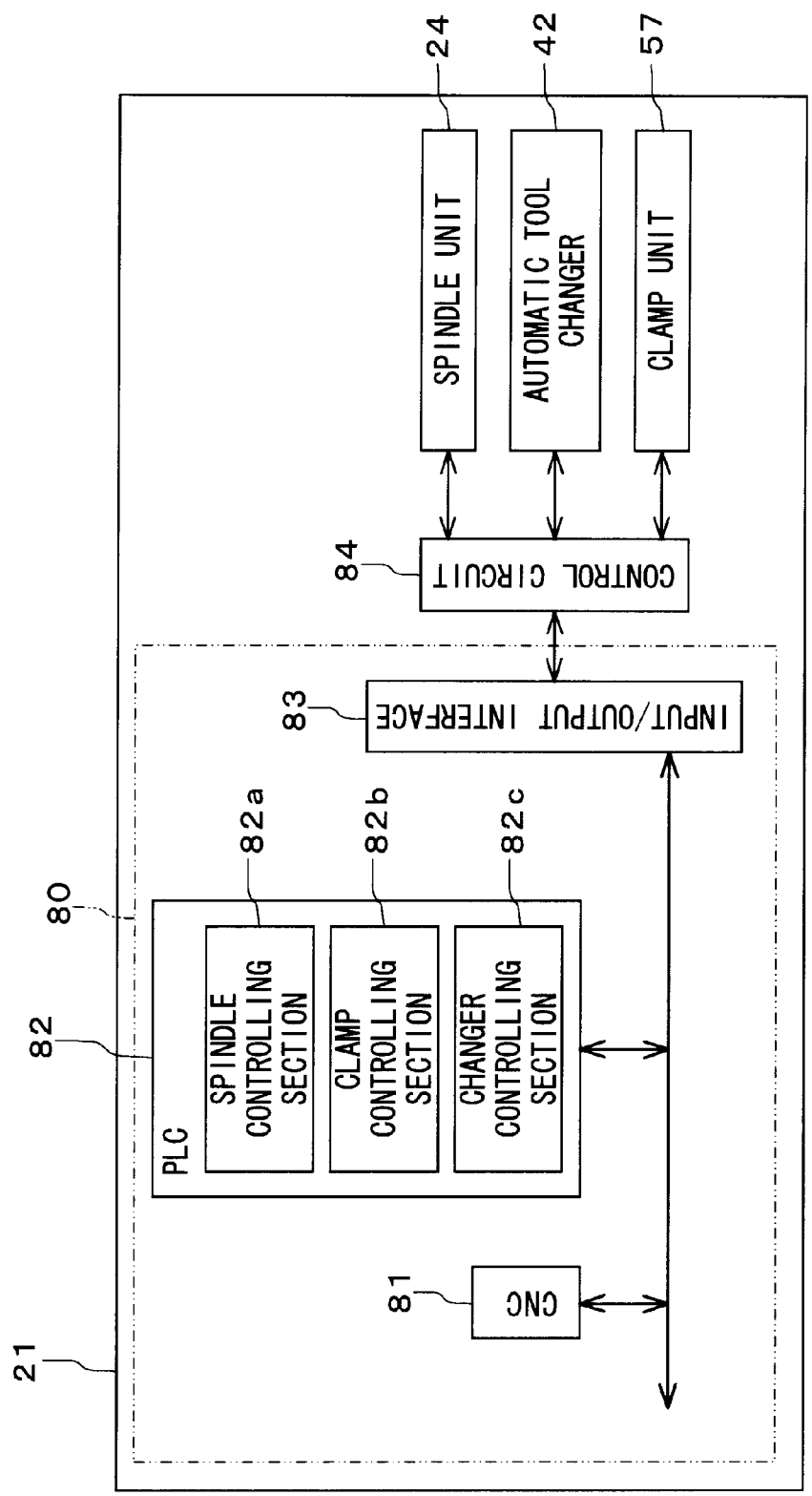
FIG. 13 is a block diagram schematically illustrating the construction of a numerical controller for controlling operations of the machine tool shown in FIG. 10.

Further, the supplier side management unit 3 may further include a life expectancy determining section 104, as shown in FIG. 9, which is adapted to perform the same operations as the life expectancy determining section 92 for the determination of the wear degrees $L_{act}$ and the estimation of the replacement dates $D_{chg}$. In this case, raw data of the operating conditions is transmitted from the respective machine tools 21 to the supplier side management unit 3 via the user side management unit 20.

Although the embodiment described above is directed to the management of the life expectancies of the spindle unit 24, the clamp unit 57 and the automatic tool changer 42, the present invention is applicable to the management of the life expectancies of any other driver mechanisms such as a feed unit having a ball screw mechanism.

What is claimed is:

1. A machine tool maintenance system comprising:

a plurality of machine tools each including a plurality of driver mechanisms and a controller for controlling operations of the driver mechanisms; and a management unit connected to the plurality of machine tools;

wherein the controller of each of the machine tools comprises a life expectancy determining section for determining degrees of wear of the respective driver mechanisms on the basis of operating conditions of the respective driver mechanisms;

wherein the management unit comprises a data storage section for receiving data indicative of the wear degrees of the respective driver mechanisms determined by the life expectancy determining section of each of the machine tools and storing the data of the wear degrees, and an output section for outputting information on the wear degrees stored in the data storage section, wherein the life expectancy determining section estimates end-of-life times at which service lives of the respective driver mechanisms end, on the basis of the determined wear degrees.

2. A machine tool maintenance system as set forth in claim 1, wherein the data storage section of the management unit receives data indicative of the wear degrees and the estimated end-of-life times from the life expectancy determining section, and stores the data, wherein the output section of the management unit outputs information on the wear degrees and the estimated end-of-life times stored in the data storage section.

3. A machine tool maintenance system comprising:

a plurality of machine tools each including a plurality of driver mechanisms and a controller for controlling operations of the respective driver mechanisms; and a management unit connected to the plurality of machine tools;

wherein the management unit comprises a life expectancy determining section for determining degrees of wear of the respective driver mechanisms on the basis of data indicative of operating conditions of the respective driver mechanisms received from the controller of each of the machine tools, a data storage section for storing data indicative of the wear degrees determined by the life expectancy determining section, and an output section for outputting information on the wear degrees stored in the data storage section, wherein the life expectancy determining section estimates end-of-life times at which service lives of the respective driver mechanisms end, on the basis of the determined wear degrees.

4. A machine tool maintenance system as set forth in claim 3, wherein the data storage section stores data indicative of the wear degrees and the estimated end-of-life times, wherein the output section outputs information on the wear degrees and the estimated end-of-life times stored in the data storage section.

5. A machine tool maintenance system as set forth in any of claims 1 to 4, wherein the management unit includes at least one management unit provided on the side of a user of the machine tools and connected via a network to a management unit provided on the side of a supplier of the machine tools, wherein the supplier side management unit comprises a data storage section for storing data indicative of life expectancies of the respective driver mechanisms received from the user side management unit, and an output section for outputting information on the life expectancies stored in the data storage section.

6. A machine tool maintenance system comprising:

a plurality of machine tools each including a plurality of driver mechanisms and a controller for controlling operations of the respective driver mechanisms;

at least one management unit provided on the side of a user of the machine tools and connected to the plurality of machine tools; and a management unit provided on the side of a supplier of the machine tools and connected to the user side management unit;

wherein the supplier side management unit comprises a life expectancy determining section for determining degrees of wear of the respective driver mechanisms on the basis of data indicative of operating conditions of the respective driver mechanisms received from the controller via the user side management unit, a data storage section for storing data indicative of the wear degrees determined by the life expectancy determining section, and an output section for outputting information on the wear degrees stored in the data storage section, wherein the life expectancy determining section determines the wear degrees of the respective driver mechanisms and estimates end-of-life times at which service lives of the respective driver mechanisms end, on the basis of the determined wear degrees.

7. A machine tool maintenance system as set forth in claim 6, wherein the data storage section stores data indicative of the wear degrees determined by the life expectancy determining section and the estimated end-of-life times, wherein the output section outputs information on the wear degrees and the estimated end-of-life times stored in the data storage section.

* * * * *